(12) United States Patent
Park

(10) Patent No.: US 6,304,025 B1
(45) Date of Patent: Oct. 16, 2001

(54) STRUCTURE FOR FASTENING FLAT BRAUN TUBE TO CABINET

(75) Inventor: Sang Yoon Park, Kyongsangbuk-do (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 09/353,604

(22) Filed: Jul. 14, 1999

(30) Foreign Application Priority Data

Jul. 14, 1998 (KR) .................................................. 98/28368

(51) Int. Cl.⁷ ....................................................... H01J 29/80
(52) U.S. Cl. .......................... 313/402; 313/407; 313/408; 313/477
(58) Field of Search ..................................... 313/402, 407, 313/408, 479

(56) References Cited

FOREIGN PATENT DOCUMENTS

A55146849  11/1980  (JP) .
A57194441  11/1982  (JP) .

*Primary Examiner*—Vip Patel

(57) ABSTRACT

Structure for fastening a flat Braun tube to a cabinet, which can prevent damage to a panel and reduce assembly working-hours, including a holding member for fastening to a portion of an outer circumference of the panel, and a lug fitted to the holding member for fastening to the cabinet.

8 Claims, 7 Drawing Sheets

STRUCTURE FOR FASTENING FLAT BRAUN TUBE TO CABINET

BACKGROUND OF THE INVENTION

1. Field of the Invention

The present invention relates to a structure for fastening a flat Braun tube to a cabinet, and more particularly, to an improved structure for fastening a flat Braun tube to a cabinet, which can prevent damage to a panel and reduce assembly working-hours.

2. Background of the Related Art

The Braun tube(a cathode ray tube) is used in a TV receiver or a display, and particularly, the flat Braun tube becomes popular recently because the flat Braun tube is advantageous in that a distortion of image can be reduced in comparison to a curved surfaced Braun tube, resulting to provide an image close to an actual image.

Referring to FIG. 1, the flat Braun tube is provided with a rectangular frame of a rail 2 attached on an inside surface of a flat panel 1, and a mask 3 having a plurality of slits bonded to the rail 2 under tension. And, there are a funnel 4 of a bulb form with a neck portion 4a at rear thereof bonded to a periphery of the inside surface of the panel 1, an electron gun 5 sealed in the neck portion 4a for emitting electron beams for red, green, and blue colors, and deflection yokes 6 on outer circumference of the neck portion 4a adapted to form vertical/horizontal uniform magnetic fields for deflection of the electron beams. As shown in FIGS. 2 and 3, the foregoing flat Braun tube is encased in front/rear cabinets 7 and 8, and the flat Braun tube 9 and the front cabinet 7 are fastened together by a compression band 10. The compression band 10, formed of a metal which expands and contracts on heating/cooling, has a rectangular form in overall. There is a lug 11 at each corner of the compression band 10 for fastening to the front cabinet 7. In order to fasten the compression band 10 and the panel 1, at first adhesive tape 12 is attached on an outer circumference of the panel 1, the compression band 10 is heated to lengthen an inner circumference of the compression band 10 longer than at least the outer circumference of the panel 1. Then, the panel 1 with the adhesive tape 12 attached thereto is inserted inside of the compression band 10 and cooled down at a room temperature, to leave the compression band 10 shrink around the outer circumference of the panel 1, thereby fastening the compression band 10 and the panel 1. In the meantime, the panel 1 with the compression band 10 fastened thereto is fastened to the front cabinet 7 by bringing the lugs 11 at four corners of the compression band 10 into a close contact with an inside of the front cabinet 7, and fastening the compression band 10 and the front cabinet together by means of fastening means, such as screws. For reference, the adhesive tape 12 attached along the outer circumference of the panel 1 acts as an insulator which prevents transmission of a high temperature of about 400° C. applied in lengthening the compression band 10 to the outer circumference of the panel 1 directly, strengthens the adhesive force between the panel 1 and the compression band 10 as the adhesive tape 12 is melt by the heat applied to the compression band 10, and prevents the outer circumference of the panel 1 from being damaged and broken by the compression band 10.

However, the structure for fastening a flat Braun tube to a cabinet by means of the related art compression band 10 has the following problems.

First, in a case the lengthening of the compression band 10 is inadequate, with the outer circumference of the panel 1 being equal to or greater than the inner circumference of the compression band 10, a forced insertion of the compression band 10 to inside of the panel 1 may cause breakage of a corner of the panel 1, which is relatively weak. And, the forced insertion of the compression band 10 to inside of the panel 1 may push the adhesive tape 12 away from the outer circumference. Opposite to this, an excessive lengthening of the compression band 10 over a limit of the lengthening causes a poor fastening with the panel 1 due to a limit in contraction.

Second, the panel 1, under an excessive contraction, is contracted together with the compression band 10 at cooling down the compression band 10, to deteriorates landing or explosion proof characteristics of the flat Braun tube. Particularly, as shown in FIG. 4, in a case of an 22" panel 1, it is found that the panel 1 is deformed inwardly by approx. 6 mils(=152 μm) at evacuation of the flat Braun tube, which becomes serious with a deformation ratio of 10% when the compression band 10 is contracted.

Third, the fastening of the compression band 10 with the panel 1 which requires heating the compression band 10, to lengthen the compression band 10, cooling the compression band 10 for compression onto the panel 1 has a problem of requiring many working-hours.

SUMMARY OF THE INVENTION

Accordingly, the present invention is directed to an improved structure for fastening a flat Braun tube to a cabinet that substantially obviates one or more of the problems due to limitations and disadvantages of the related art.

An object of the present invention is to provide an improved structure for fastening a flat Braun tube to a cabinet, which does not deteriorate characteristics of a Braun tube and simplifies the assembly of the Braun tube and the cabinet.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the structure for fastening a flat Braun tube to a cabinet, includes a holding member for fastening to a portion of an outer circumference of the panel, and a lug fitted to the holding member for fastening to the cabinet.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Reference will now be made in detail to the preferred embodiments of the present invention, examples of which are illustrated in the accompanying drawings.

Figure 1:
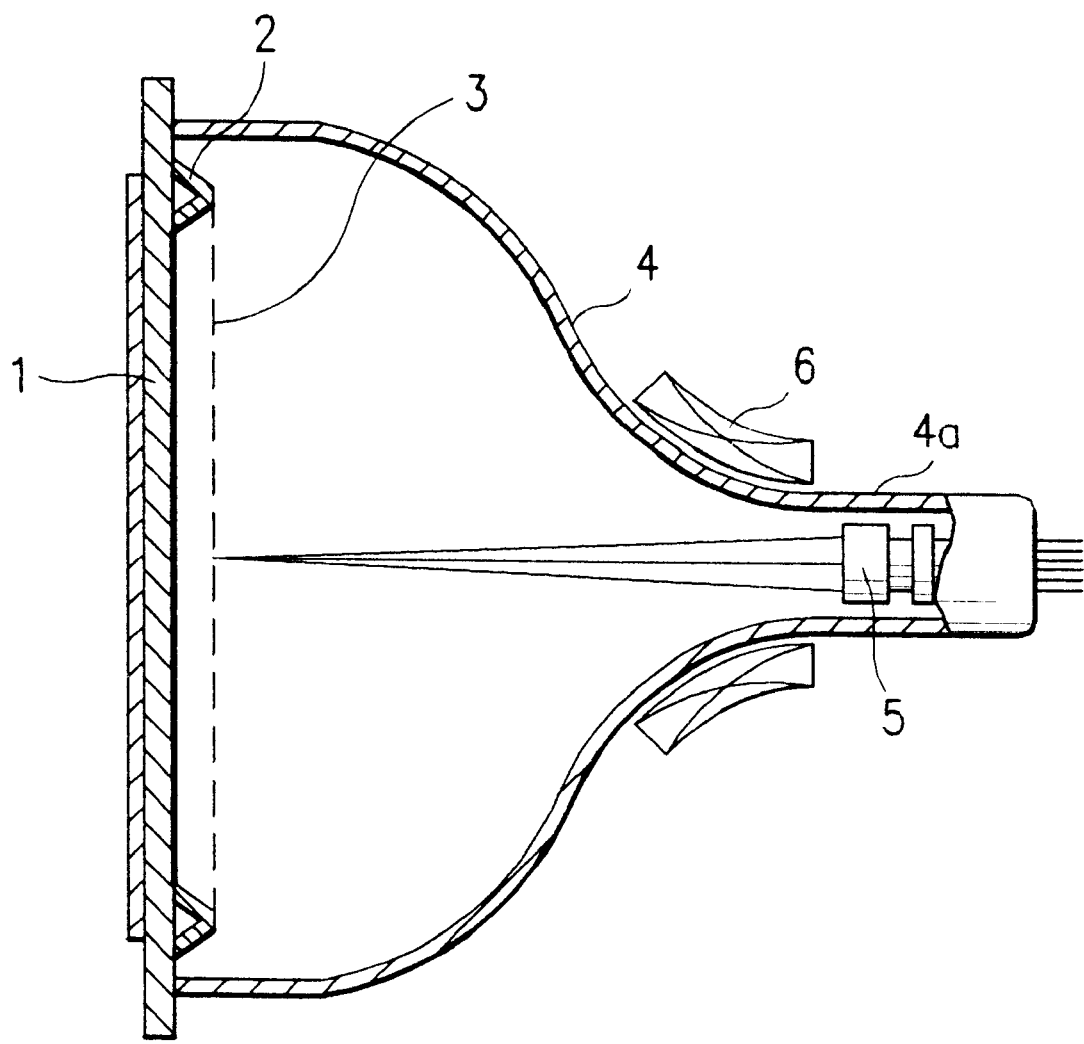
FIG. 1 illustrates a cross section of a related art flat Braun tube.
Figure 2:
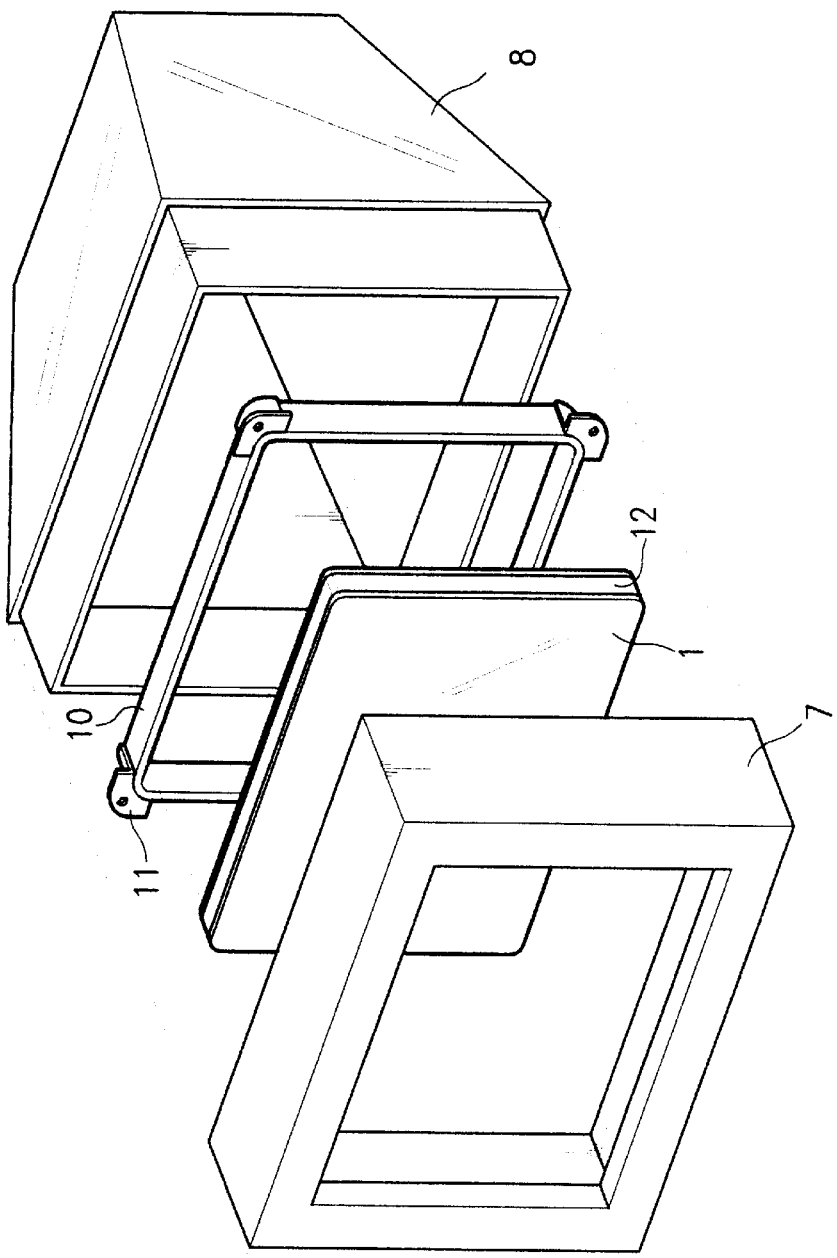
FIG. 2 illustrates a perspective disassembled view of a flat Braun tube and a cabinet.
Figure 3:
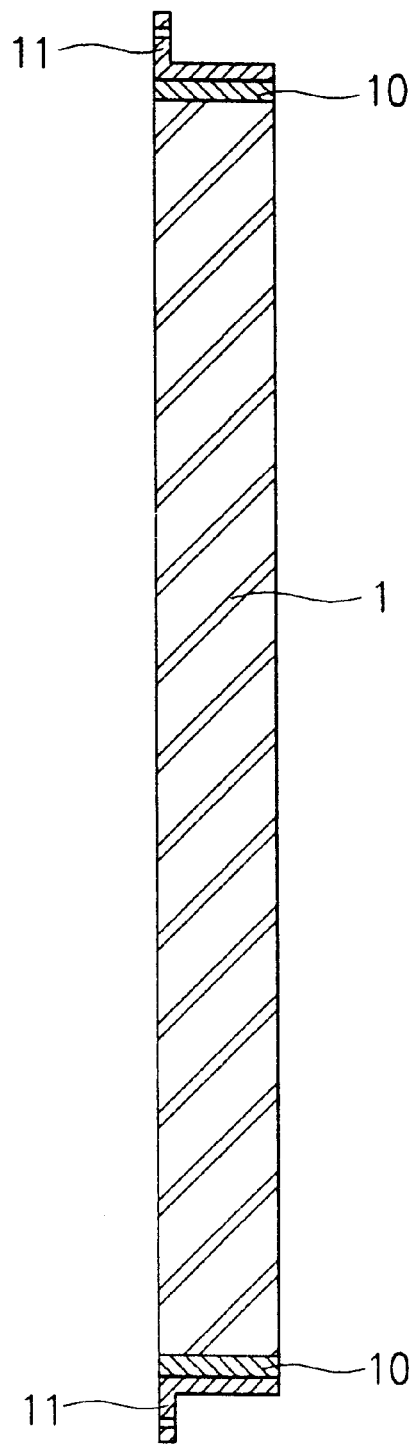
FIG. 3 illustrates a section of a related art panel and a compression band in a coupled state.
Figure 4:
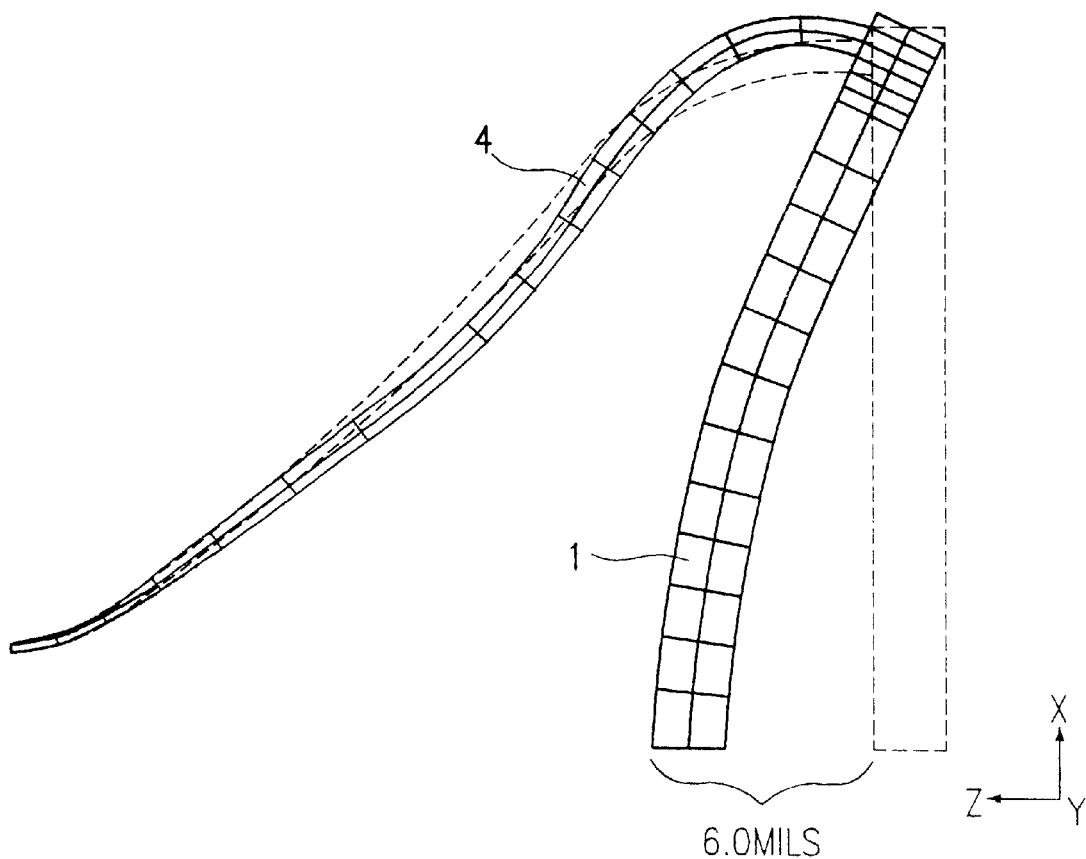
FIG. 4 illustrates deformation of a panel in an evacuation process.
Figure 5:
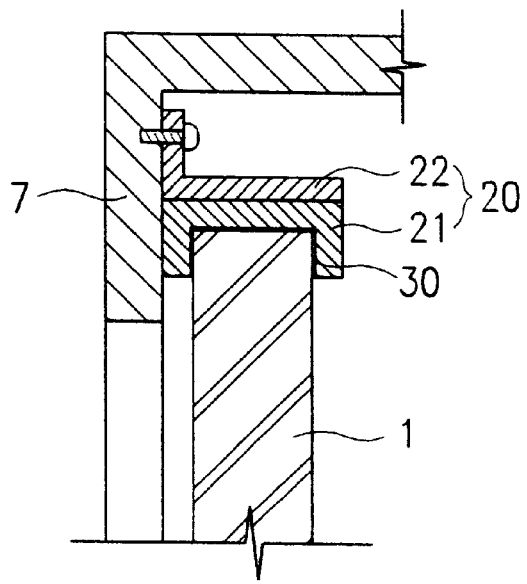
FIG. 5 illustrates a fastening unit in accordance with a first preferred embodiment of the present invention.
Figure 6:
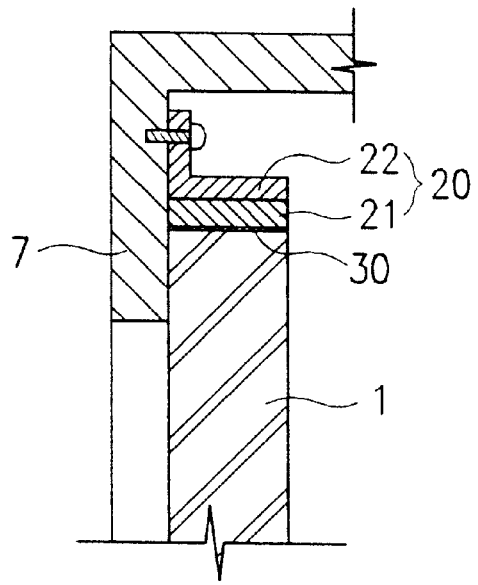
FIG. 6 illustrates a fastening unit in accordance with a second preferred embodiment of the present invention; and, FIGS. 7A~7C illustrate various embodiments for fastening the fastening unit to the panel.

Referring to FIG. 5, the fastening unit 20 of the present invention for fastening a flat Braun tube to a front cabinet includes a plurality of holding members 21 for coupling with a portion of an outer circumference of the panel 1, and a plurality of lugs 22 formed on the holding member 21 for coupling with a front cabinet 7. The panel 1 and the holding member 21 are bonded with adhesive 30, which is simple and easy. The bonding surface of the holding member 21 and the panel 1 may be flat in correspondence to the outer circumference of the panel 1 as shown in FIG. 6 or of a channel section as shown in FIG. 5. The former bonding surface relies on a bonding force, while the latter bonding surface holds the panel 1 firmly with the channel form, the latter one is effective in holding the panel 1.

Figure 7A:
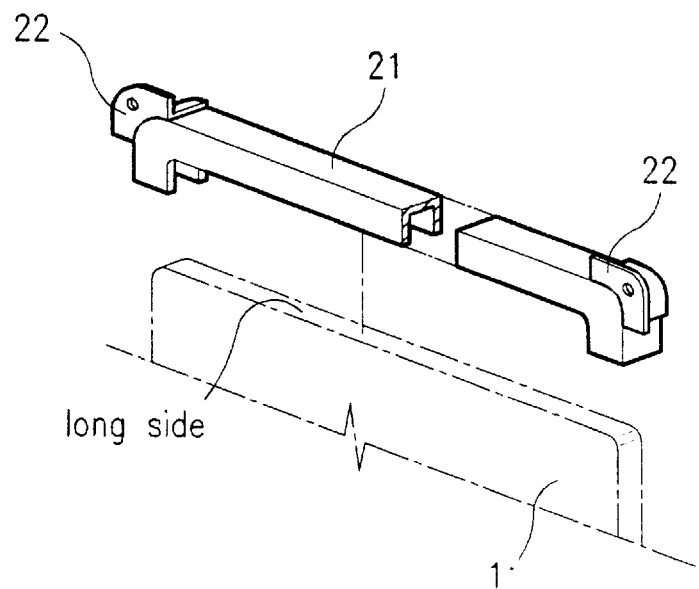
Figure 7B:
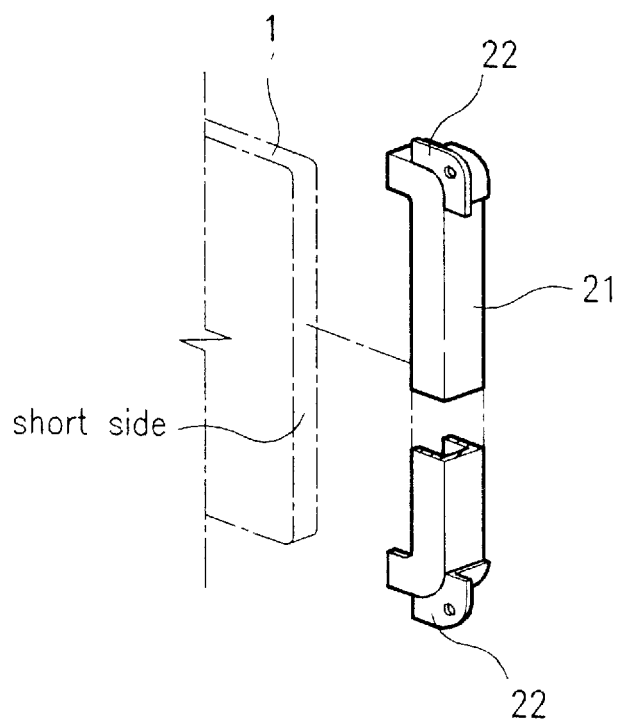
Figure 7C:
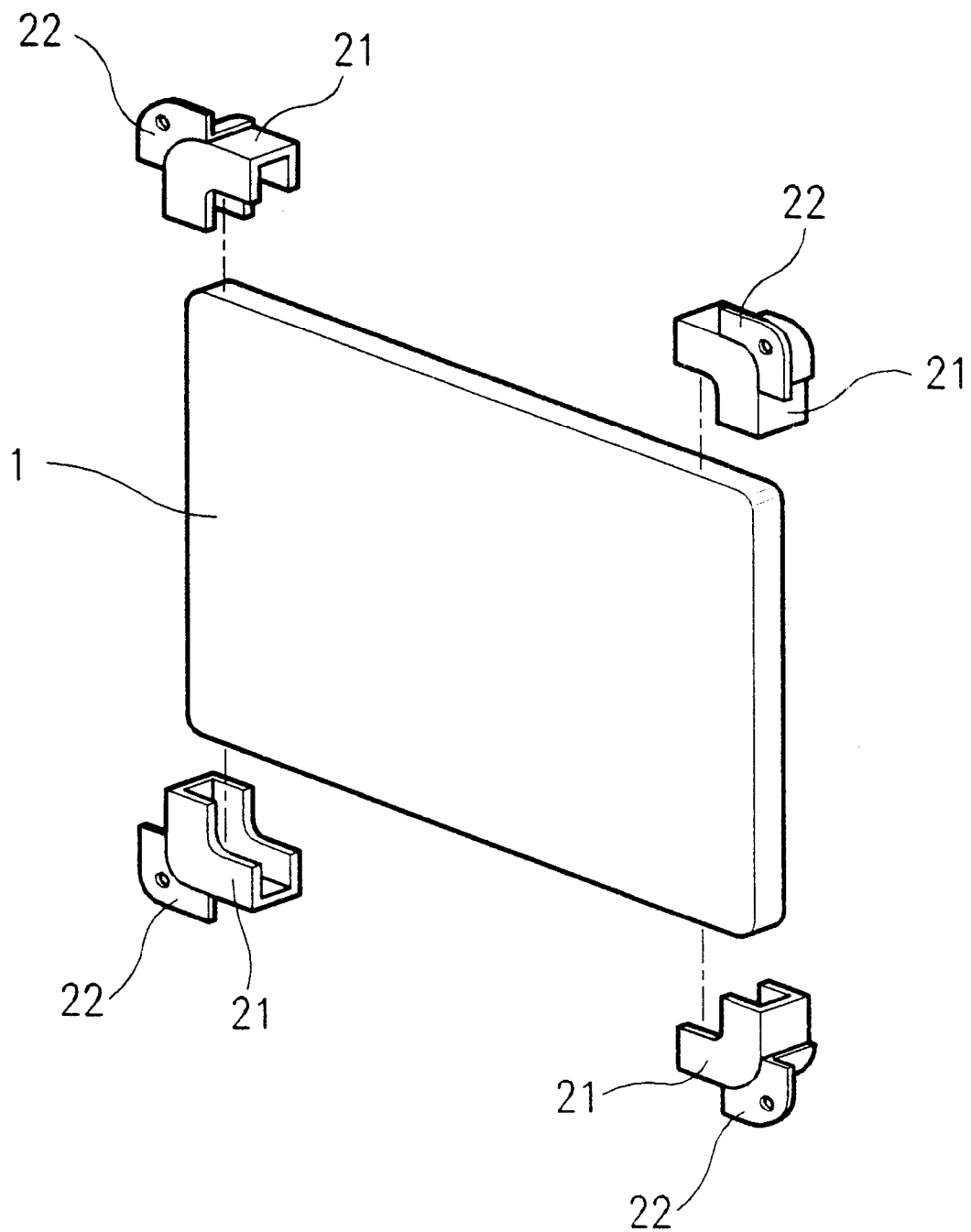

In the meantime, as shown in FIGS. 7A~7C, the holding member 21 and the panel 1 may be coupled in a variety of forms; the holding members 21 may be coupled to long sides of the panel 1 as shown in FIG. 7A, the holding members 21 may be coupled to short sides of the panel 1 as shown in FIG. 7B, or the holding members may be coupled to four corners of the panel 1. In this instance, the bonding force between the holding member 21 and the front cabinet 7 is dependent on positions and number of the lugs 22 formed on an outer circumference of the holding member 21, wherein structures shown in FIGS. 7A and 7B in which the holding members 21 are coupled either to long sides or short sides of the panel 1 provide maximum coupling forces with minimum coupling elements because the lugs 22 are positioned close to both ends of an outer circumference of the holding members 21. Of course, another lug 22 may be added between the lugs 22 at both ends of the holding member 21 for reinforcing the bonding force, which however requires additional assembly time due to increased number of lug.

The action of the fastening unit of the present invention will be explained.

In the present invention, the related art unitary compression band is divided into a plurality of components, which are called as a fastening unit 20, and bonded to an outer circumference of the panel 1 with adhesive 30. The fastening unit 20 includes a holding member 21 for bonding to an outer circumference of the panel 1 with adhesive 30, and a lug 22 formed on an outer circumference of the holding member for fastening to a front cabinet 7. The holding members 21 have a difference only in lengths depending on positions of coupling among the long sides, short sides, or corners, but have similar forms(see FIGS. 7A~7C). The length of the holding member 21 is preferably designed to fit to a coupling position. For example, if the holding member 21 is for coupling to the long side, and the length of the holding member 21 is substantially shorter than the long side of the panel 1, the coupling force will be reduced as much as the bonding area between the holding member 21 and the panel 1 will be reduced. Therefore, it is important that the length of the holding member 21 is fixed with reference to a long side of the panel 1, for securing an adequate bonding area.

In assembling the panel 1, the fastening unit 20 and the front cabinet 7 under a state the foregoing conditions are met, the panel 1 and the holding member 21 are bonded together with adhesive 30, the lugs 22 on the outer circumference of the holding member 21 is brought into a close with an inside of the front cabinet 7, and the lugs 22 and the front cabinet 7 are fastened by fastening means such as screw, thereby completing assembly which is simpler than the related art. That is, since the process of attaching an adhesive tape on an outer circumference of the panel 1 and the process of lengthening and contracting the compression band can be omitted, the assembly is simplified. And, the simple method of coupling the holding member 21 and the panel 1 with the adhesive 30 permits to prevent damage to the outer circumference of the panel 1 in advance. The channel section of the holding member 21 for inserting to the outer circumference of the panel 1 can double the bonding force between the holding member 21 and the panel 1. Of course, the flat surfaced holding member 21 can have a bonding force owing to a bonding force of the adhesive 30, the channel sectioned holding member 21 can provide a better bonding force.

By employing a system of coupling the panel and the holding member at required locations by bonding while fastening the panel by means of a compression force of the compression band is excluded, the structure for fastening a flat Braun tube to a cabinet of the present invention allows to prevent the contraction of the panel and the damage to the panel which have been problems of the related art and to simplify an assembly process which is favorable in view of productivity and cost competitiveness.

It will be apparent to those skilled in the art that various modifications and variations can be made in the structure for fastening a flat Braun tube to a cabinet of the present invention without departing from the spirit or scope of the invention. Thus, it is intended that the present invention cover the modifications and variations of this invention provided they come within the scope of the appended claims and their equivalents.

What is claimed is:

1. A structure for fastening a flat Braun tube to a cabinet, wherein the flat Braun tube having a panel and a funnel is encased in the cabinet, the structure comprising:

a holding member for fastening to a portion of an outer circumference of the panel; and, a lug fitted to the holding member for fastening to the cabinet, wherein the fastening surface has a channel section for insertion of the outer circumference of the panel.

2. A structure as claimed in claim 1, wherein the holding member is fastened to a long side of the panel.

3. A structure as claimed in claim 1, wherein the holding member is fastened to a short side of the panel.

4. A structure as claimed in claim 1, wherein the holding member is fastened to a corner of the panel.

5. A structure as claimed in claim 1, wherein a fastening surface between the holding member and the panel is flat.

6. A structure as claimed in claim 1, wherein a fastening surface between the holding member and the panel is bonded by an adhesive.

7. A structure as claimed in claim 5, wherein a fastening surface between the holding member and the panel is bonded by an adhesive.

8. A structure as claimed in claim 1, wherein a fastening surface between the holding member and the panel is bonded by an adhesive.

* * * * *